(12) United States Patent
Goldman et al.

(10) Patent No.: US 7,631,641 B1
(45) Date of Patent: Dec. 15, 2009

(54) SOLAR HEAT ABSORBING AND DISTRIBUTING SYSTEM

(75) Inventors: Michael I. Goldman, 141 Joralemon St., #2H, Brooklyn, NY (US) 11201; David A. Goldman, Yorktown Heights, NY (US)

(73) Assignee: Michael I. Goldman, Brooklyn, NY (US)

( * ) Notice: Subject to any disclaimer, the term of this patent is extended or adjusted under 35 U.S.C. 154(b) by 0 days.

(21) Appl. No.: 11/999,970

(22) Filed: Dec. 10, 2007

Related U.S. Application Data (63) Continuation-in-part of application No. 11/803,383, filed on May 15, 2007.

(51) Int. Cl.
*E04D 13/18* (2006.01)
(52) U.S. Cl. ............... 126/629; 126/595; 126/628; 126/701; 126/569
(58) Field of Classification Search ............ 126/569, 126/573, 600, 628, 631, 701, 595, 629
See application file for complete search history.

(56) References Cited

U.S. PATENT DOCUMENTS

| | | | | |
|---|---|---|---|---|
| 3,294,152 A | * | 12/1966 | Kuijvenhoven | 160/5 |
| 4,112,918 A | * | 9/1978 | Palkes | 126/596 |
| 4,127,102 A | * | 11/1978 | Berman | 126/583 |
| 4,180,954 A | * | 1/1980 | Gell, Jr. | 52/171.3 |
| 4,228,787 A | * | 10/1980 | Steinemann | 126/632 |
| 4,235,048 A | * | 11/1980 | Gillery | 49/390 |
| 4,249,714 A | * | 2/1981 | Boyle | 248/267 |
| 4,263,760 A | * | 4/1981 | Gell | 49/63 |
| 4,296,734 A | * | 10/1981 | Nevins | 126/628 |
| 4,351,320 A | * | 9/1982 | Tetirick | 126/607 |
| 4,378,786 A | * | 4/1983 | Comeau, Jr. | 126/631 |
| 4,382,436 A | * | 5/1983 | Hager | 126/630 |
| 4,442,827 A | * | 4/1984 | Helman et al. | 126/617 |
| 4,508,154 A | * | 4/1985 | Wheeler | 160/98 |
| 4,550,758 A | * | 11/1985 | Johnson et al. | 160/271 |
| 4,592,337 A | * | 6/1986 | Ritchie et al. | 126/702 |
| 4,601,282 A | * | 7/1986 | Mountain | 126/574 |
| 4,649,980 A | * | 3/1987 | Kunz | 160/98 |
| 4,655,195 A | * | 4/1987 | Boynton | 126/631 |
| 4,706,649 A | * | 11/1987 | Hager | 126/606 |
| 4,766,941 A | * | 8/1988 | Sloop et al. | 160/241 |
| 4,784,215 A | * | 11/1988 | Sing | 165/41 |
| 4,813,198 A | * | 3/1989 | Johnston et al. | 52/171.3 |
| 5,081,982 A | * | 1/1992 | MacKenzie | 126/631 |
| 5,467,266 A | * | 11/1995 | Jacobs et al. | 700/56 |
| 5,663,621 A | * | 9/1997 | Popat | 318/480 |
| 5,735,328 A | * | 4/1998 | Salhoff et al. | 160/25 |
| 6,084,231 A | * | 7/2000 | Popat | 250/214 AL |
| 2005/0102934 A1 | * | 5/2005 | Winarski | 52/204.6 |
| 2006/0000558 A1 | * | 1/2006 | Fennell | 160/7 |

* cited by examiner

*Primary Examiner*—Kenneth B Rinehart
*Assistant Examiner*—Jorge Pereiro
(74) *Attorney, Agent, or Firm*—Alfred A. Fressola; Ware, Fressola, Van Der Sluys & Adolphson LLP (57) ABSTRACT

In a preferred embodiment, an apparatus, including: a highly radiant heat absorbing material placed closely spaced from and generally parallel to an inside surface of a glass panel disposed in a wall or a door so as to form therebetween a plenum, the highly radiant heat absorbing material being at least partially visually clear.

27 Claims, 8 Drawing Sheets

SOLAR HEAT ABSORBING & DISTRIBUTION SYSTEM

SOLAR HEAT ABSORBING AND DISTRIBUTING SYSTEM

CROSS-REFERENCE TO RELATED APPLICATION

The present application is a Continuation-In-Part of copending application Ser. No. 11/803,383, filed May 15, 2007, and titled SOLAR HEAT ABSORBING AND DISTRIBUTING SYSTEM.

BACKGROUND OF THE INVENTION

1. Field of the Invention

The present invention relates to solar heat generally and, more particularly, but not by way of limitation, to a novel solar heating and distribution system.

2. Background Art

A number of solar heating systems have been used and/or proposed. Prominent among them are the following:

The Trombe wall is elegant in its simplicity and dependability. It consists of a south-facing glass wall and a vertical blackened concrete wall with an air space between them. Energy from the sun passes through the glass and is trapped and absorbed by the wall. Rectangular openings at the base and the top of the wall allow air warmed by the concrete wall to flow into the living space by thermosiphoning. This process continues at night after the sun goes down. To counter the effect of reverse thermosiphoning, the openings may be mechanically closed when the air reverses and flows from the living space to the cooled glass wall. The Trombe wall is thermally effective but is an esthetically poor and relatively expensive massive design for storing and circulating sun-warmed air. One disadvantage of the Trombe wall is that one cannot see through it.

Another system is the Solar Slab which uses conventional building materials. A series of ducts underneath the living space is formed by laying conventional concrete blocks on their sides. During the day, warmed air from the living space warms the blocks and, at night, the warmed air from the blocks warms the living space. This is passive energy transfer, as is the Trombe wall, but among its disadvantages the giving up of a basement space. In at least some parts of the United States, builders refuse to build this type of home because of the possibility of collapse of the ducts.

Among the non-passive methods are various techniques that use roof-mounted solar collectors and pumps to pump heated liquid to a reservoir and various techniques that use heat pumps. These are usually relatively costly.

Accordingly, it is a principal object of the present invention to provide a solar heat absorbing and distributing system that circulates heated air to a living space.

It is a further object of the invention to provide such a system that achieves some of the advantage of a Trombe wall, while allowing one to see through the heat absorbing member.

It is an additional object of the invention to provide such a system that uses very little outside fuel-supplied energy.

Other objects of the present invention, as well as particular features, following description and the accompanying drawing figures.

SUMMARY OF THE INVENTION

The present invention achieves the above objects, among others, by providing an apparatus, comprising: a highly radiant heat absorbing material placed closely spaced from and generally parallel to an inside surface of a glass panel disposed in a wall or a door so as to form therebetween a plenum, said highly radiant heat absorbing material being at least partially visually clear.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

The system of the present invention provides a simple, unobtrusive, and economical means for accumulating and distributing solar heat from windows and doors while reducing hot and cold spots. About a 25-30% reduction in main heating is estimated achievable in a 50%/50% ratio solar energy to main heating supplied passive solar structure by increasing the glass area of windows and doors, without causing overheating, overbrightness, and discomfort associated with overglazing.

Reference should now be made to the drawing figures, provided for purposes of illustration only, and on which the figure numerals in parentheses (when used) refer the reader to the figure in which the element(s) being described is (are) more fully shown, although the element(s) may be shown on other figures also.

Figure 1:
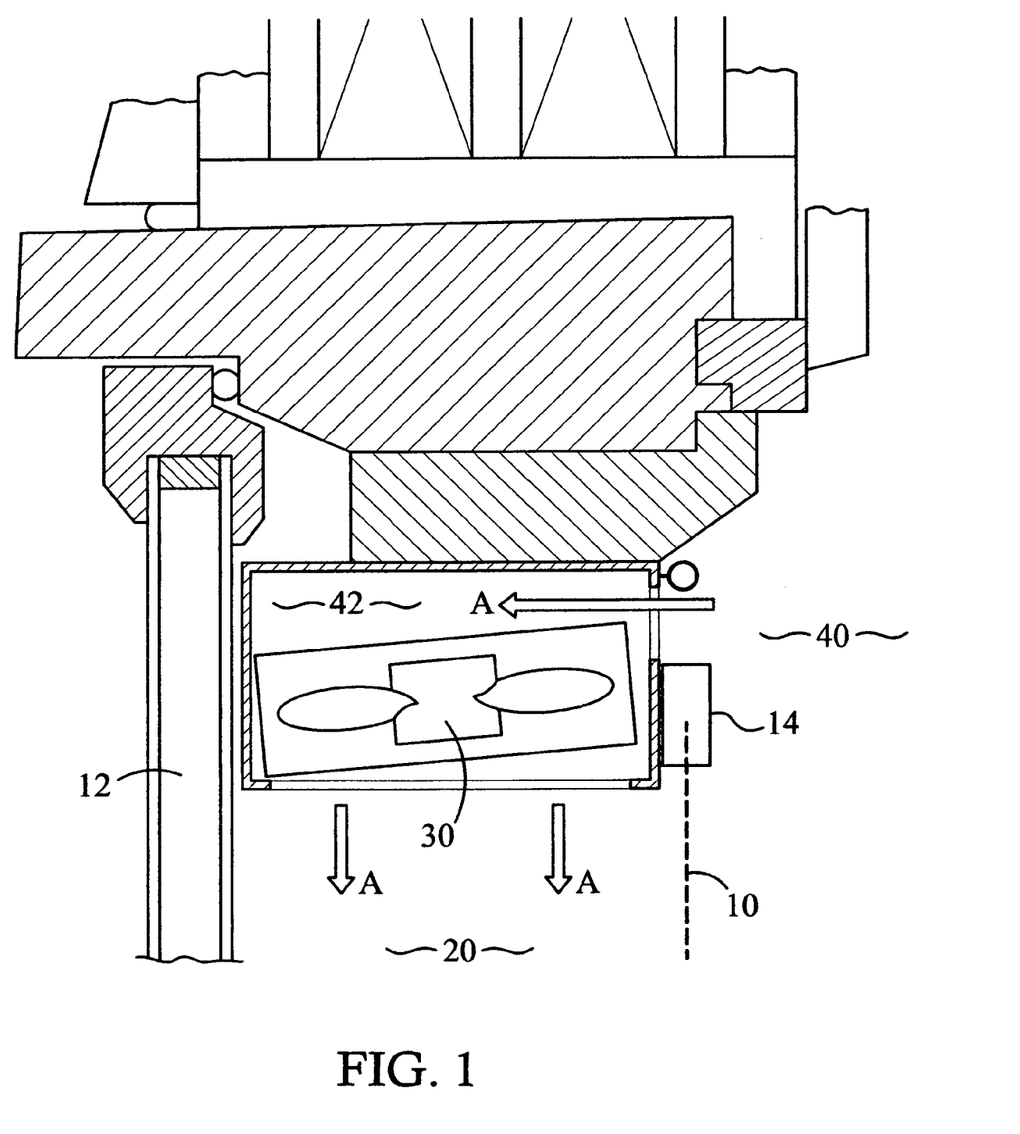
FIG. 1 is a fragmentary, side elevational view in cross-section (also taken along line "1-1" of FIG. 4) of one embodiment of an air circulation section of the present invention.

FIG. 1 illustrates one embodiment of the present invention and illustrates a screen 10 generally parallel to a glass window 12 in a door or wall, with the screen disposed in a frame 14, and with the screen about 2-3 inches from the inside of the glass window. The side of screen 10 and frame 14 facing glass window 12 may be coated with a highly absorbent (up to e.g., 97%) radiant absorbing paint, which may be a black flat paint, or the screen may be composed of a highly absorbent material, such as aluminum or grey plastic. For example, about a 2/1 clear-to-opaque screen mesh ratio reduces structure interior sunlight by 35%, allowing 65% to enter while providing good external visibility. Although screen 10 is perforated, the screen, glass window 12, and casement sides form an effective plenum 20 for moving air. Of course, a radiant heat absorbing and transmitting material other than a screen may be used.

Figure 4:
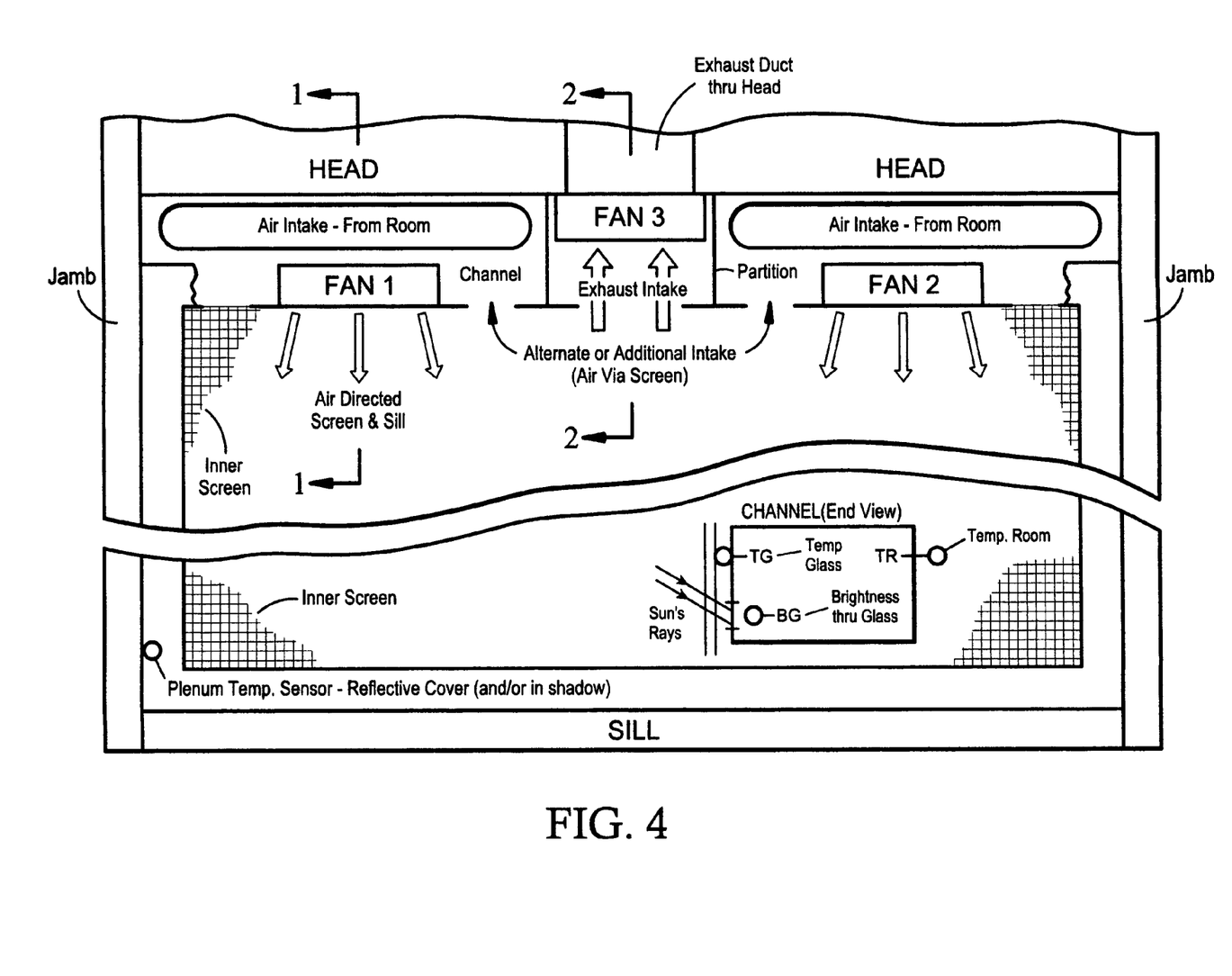
FIG. 4 is a schematic and fragmentary end elevational view of the embodiment of FIG. 1.

A distributing fan 30 (shown tilted about 10 degrees from horizontal toward screen 10 on FIG. 1), about 2-3 inches square, draws air from living space 40 through an opening formed in a channel 42 at the top of plenum 20 and directs the air downward over the surface of screen 10 facing glass window 12, as shown by the arrows marked "A" on FIG. 1. The temperature controlled air flow (See FIG. 4) is largely confined in plenum 20, with only a small amount of air dispersed through screen 10 into living area 40, until the heated air reaches the sill and is diverted through the bottom of the screen close to floor level (neither shown on FIG. 1). A sensor module in channel 42 (See FIG. 4) controls the air flow. The warm air aids in heating the lower portion of living area 40 and shadowed areas under windows. Using highly absorbent screen 10, sunlight heats the 35% opaque (solid) area of the screen. This heats the air in plenum 20 and transmits a portion of the absorbed heat by conduction and convection to living space 40. (The interior radiant heating pattern of the opaque area is diffused.)

Figure 2:
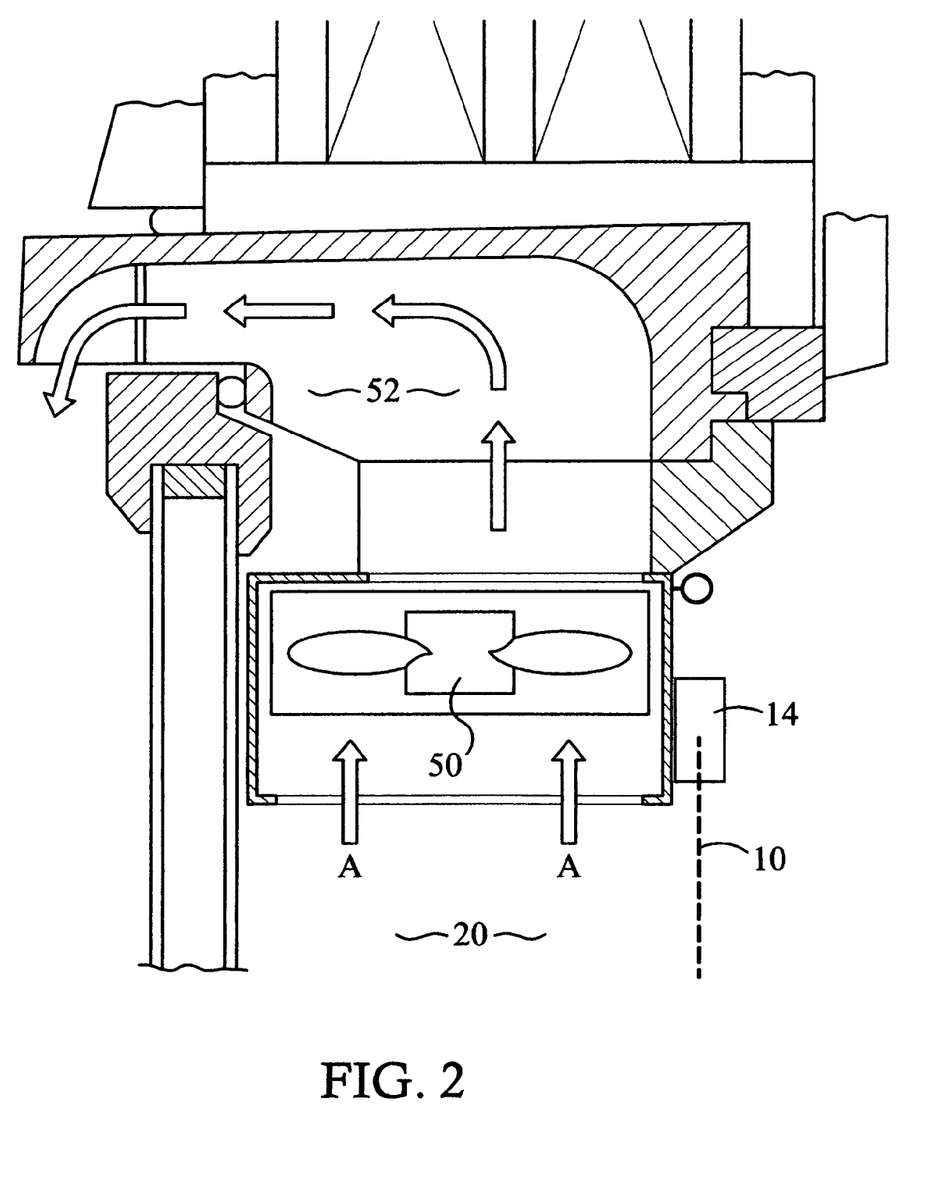
FIG. 2 is a fragmentary, side elevational view in cross-section (also taken along line "2-2" of FIG. 4) of an air exhaust section of the embodiment of FIG. 1.

FIG. 2 illustrates the embodiment of FIG. 1 of the channel in its exhaust mode in which air is drawn from plenum 20 and exhausted to the outside to cool the plenum. Here, an exhaust fan 50, with dimensions approximately as given above, draws air from plenum 20 and exhausts it through channel 52 to the outside to keep the plenum within tolerable temperature limits.

With fans 30 and 50 off, the temperatures in plenum 20 can reach approximately 100-120 degrees Fahrenheit, depending on latitude, season, solar and structural orientation, condition of glass, etc. An electronic temperature sensor (or, e.g., a typical thermostat control in conjunction with a compact sensing and control module in the channel) and fans control heated airflow and maintain the plenum about five degrees above desired room temperature, keeping glass loss low. For example, a temperature sensor may be mounted in a jamb casement thermally insulated from the jamb and exposed to plenum air. Alternatively, algorithms may be employed (described infra). Brightness-sensing may be used in conjunction with temperature measurements for anticipating changes in temperature.

Brightness, B, (solar light, radiation, intensity, etc.—used interchangeably) is measured normal to screen. When brightness is relatively low but above threshold, B1, and the plenum temperature, T"P", is above T1 (e.g., five-ten degrees Fahrenheit above desired room temperature), the distributing fans are activated. Depending on brightness and temperature levels, air will be directed into the plenum and distributed to the interior. By keeping the plenum temperature slightly above room temperature, TR, glass losses are minimal. The fans may be on-off or variably controlled by temperature deviation from ambient temperature desired (for example, seventy degrees Fahrenheit).

B can be used as a measure of British thermal units (BTU's)/hour entering through the glass. When B reaches a high level, B2 where room temperature near the window, TR, is starting to rise beyond the level desired, the fans are turned off or flow is reduced and the exhaust fan is controlled to keep TR at the desired level. Note: local window temperature, TR, and/or zone temperature, TZ, may be employed.

Over-glazing can produce excess air heating and hot spots in structures. However, if excess heat is removed automatically, at each window or centrally, peak over-radiation heating can be avoided while effectively utilizing over glazing for increased heating in periods of lower and moderate radiation (due to solar light angle to glass, sky conditions, etc.). Hot spots are reduced by screens. (Over-glazing is highly significant in this system.)

A light sensor using a photo-transistor or small solar cell, etc., is mounted on the control module in the channel facing the glass. Fan speeds can be reduced or stopped during very intense radiation—i.e., greater than B2.

In the exhaust mode, air is drawn from the plenum (replenished through the screen and by structure infiltration) by the exhaust fan through the opening in the top of the channel and then exhausted through the openings in the head parts. Exhaust air in the duct formed in the centers is directed through a grill which restricts insects while providing sufficient air opening. The grill also reduces infiltration when the exhaust fan is off and may be located elsewhere in the duct. An airflow controlled flap in the duct may be used to reduce infiltration with the fan off.

Note: Plenum temperatures rise with high radiation and low fan speed, and increased glass loss could partially compensate for over-radiation. This is an interesting compensation effect and may have other applications.

In far more prevalent periods of moderate solar radiation where air exhaust is not required, fuel (energy) saving of about 25-30% may be realized with 35% over glazing. An average fuel saving of about 25% is estimated combining periods of peak, moderate, and low solar radiation.

The absorbent screen system (with, for example, 75% of glass area screened) compared with a passive structure using traditional, partially reflective uncoated screens may produce an additional saving of about 10%. Total combined savings may reach about 30%.

Various degrees of sophistication such as anticipation using brightness, B1, mass and lag compensation, etc., are achievable with algorithms using sensed variables such as plenum and room temperatures, brightness levels, air flow rate, etc. Individual window measurement and control is possible, or "Main" averaging techniques (as described relating to zones) may be used in conjunction with local window variables for fan control.

Variables such as temperature, T, and solar intensity, B, are measured at window and door locations and can be used to derive average TZ and BZ values. A simple method is to apply local voltages proportional to TZ and BZ to resistors connected to a common wire going to a "Main" in a zone or room, where currents from each location can be summed (op-amps possible) with a voltage proportional to the average TZ and BZ transmitted back to remote locations, with each average value on a common single zone line. These average values can be used in conjunction with local measurements to afford better fan control in both distributing and exhaust modes.

An example of the effectiveness of zone control can be readily appreciated considering a room with both southern and eastern exposure. In the morning, when the solar light impinges heavily on eastern windows, a large amount of heat is absorbed by the screens, and both plenum temperature and exterior brightness can be very high. This might activate the exhaust mode, but since the sun has little effect on the southern exposure at the time, southern T and B values are low and room averages would likely not exceed a threshold which may be used to inhibit the exhaust mode, where more heat is required in the room at this time.

In this embodiment, an electric current powered central "Main" unit provides power to a number of window and door control modules and fans in channels. In addition to power, information may be superimposed on the low voltage power lines (or sent on separate lines). The "Main" may be used to program and/or aid in control of remote units as a function of weather, time of day, etc. A variety of sensor signals in window or door units or located in the "Main" (small wall opening feasible) may be utilized in conjunction with electronics, such as logic circuits and/or a microprocessor(s). "Main" exhaust in each zone is feasible with larger wall openings.

This solar radiant-heat absorbing system, with minimally active monitoring and distributing elements (fans, sensors, and controls), is highly effective for augmentation of passive solar systems. Substantial fuel saving is achieved.

The challenge of air overheating and hot and cold spots caused by over-glazing is overcome by local heat collection, air dispersal, and air exhaust (only in peak radiation intensity periods), while reducing over brilliance using an appropriate screen mesh.

The system of the present invention has two modes:
(A) Solar energy absorption, conversion to heated air within a plenum, drawing air from the plenum and evenly distributing the air and solar radiation to the interior of a structure.
(B) A systematic, automatic, unobtrusive heat-distributing exhaust mode compensates for over-glazing (large amount of glass) which is employed to achieve fuel (energy) saving.

Reducing visible interior sunlight from windows and doors to increase

All windows and doors need not be screened or require sensing and elements, and advantages thereof, will be elucidated in, or be apparent from, the heat within a structure is counterintuitive and appears contradictory. However, by using radiant absorbing inner screens and greater areas of glass in, for example, casement, double hung fixed sash windows and patio doors, etc., and a controlled fan distribution system, structure interior heat may be increased substantially. Hot and cold spots and disturbing local over brightness are also reduced. control channels (for aesthetics or cost reduction). Also, some intense sunlight in some interior regions may be desirable.

During the heating season, the system functions automatically without requiring manual intervention.

Estimates in this description of the systems's fuel (energy) savings are rough and are based assuming a 50%/50% solar energy to fuel (energy) supplied ratio.

Frequently thermal storage (for example, an air heated concrete slab) is utilized in solar energy heating systems. However, additional heat produced by over glazing may be stored alternatively in ceramic floor tiles, and thicker sheetrock (gypsum) surfaces. Of course, structural limits must be considered. This alternative to a concrete slab, (with air-heated ducts, slab insulation and non-traditional slab construction) may compensate for the additional cost of over glazing. A longer effective solar-heated day (provided by over-glazing) and inner surface heat storage may be highly practical.

In addition, a traditional basement is feasible, and retrofitting may be facilitated.

In order to obviate placing a temperature sensor within the plenum, an algorithm might be used which uses inner glass temperature (measured by sensor slightly protruding from a channel and pressing against the glass) and brightness level, B, to approximate plenum temperature level for air distribution.

If a plenum temperature sensor is used, it should be covered with highly reflective material and/or placed in a stile shadow.

Greater comfort is provided using a mix of radiant and air distributed heat. Local window air exhaust is superior to a large fan central exhaust. Multiple small fans provide more even heat distribution compared with large high velocity fans, and are much quieter (noise hardly discernable).

The fans may be mounted differently than they are depicted and a single reversible fan may be utilized for both distributing and exhaust instead of multiple fans. An air flap in the exhaust duct can be used to limit incoming air during heat collection and distribution and structure infiltration.

The screen frame heat absorption permits a greater clear-to-opaque mesh area ratio to be used. The 2/1 ratio discussed above is representative and can be different. A variable mesh ratio within one screen is feasible and can provide greater heat absorption, brightness reduction and varying visibility in different screen regions. This may be particularly useful in east or west exposures.

Heat absorbent blinds or curtains, etc., may be used with or instead of screens—gaps at periphery can distribute air and can be used to draw air in the exhaust mode.

Fans also may be activated by using solar cells and batteries. A close fit of solar energy to desired motor speed characteristics is possible. Solar cells may be of higher initial cost than units described, but may be very useful where wiring poses a problem. Electronic controls can also be powered by these same solar cells.

The interior thermal mass can be increased using traditional materials (for example, thicker and multilayer drywall, within structural limitations). This extends the solar energy heating period and requires less air exhaust and fuel (energy) consumption.

If a basic passive solar system uses air for heating thermal storage, overheated air towards the ceiling as detected by sensors and determined by zone can be ducted to heat store (slab?) when over-glazing is present, possibly eliminating the requirement for some window exhaust fans in certain areas.

The system is applicable to multilevel structures—glass can be vertical.

Greater comfort is provided with a mix of sunlight radiant heat and warm air distributed locally from window and door areas at low levels, improving the floor-to-ceiling temperature gradient.

Screens provide a measure of privacy and insect protection.

In summer, if structure and overhangs and foliage provide insufficient shading of windows and doors (particularly in east and west facing exposures), screens can be reversed after the heating season, using the uncoated non-heat absorbing side to reflect light outside through the glass.

Without air conditioning, if windows or doors with channel units are opened, exhaust fans or fans with downward air output can be used to exhaust warm ceiling air. A casement-type crank facilitates window opening.

In hot weather, if air conditioning is on, the plenum can be used with fans to draw down warmer ceiling air to reduce the ceiling-to-floor temperature gradient. Without air conditioning, if the inner side of the outside glass is relatively cooler than the room, air may still be drawn down to cool the air (effective in humid weather if open windows may cause discomfort).

Insulating curtains or shutters commonly employed for reducing glass loss at night in typical passive solar structures are still applicable and important when using this system.

In the current energy cost environment, the system payback period is anticipated to be low.

Note: on FIG. 2, a small grille is located close to the output of the exhaust duct (grille can be anywhere in the duct) to restrict insects and excess infiltration in non-exhaust periods.

Economical, small, quiet, low-voltage fans (possibly long-life brushless) requiring very little power are used for low volume local air transfer. System power consumption is low and of negligible expense.

Typical components that may be used to sense and control fans include thermistors for temperature, photo-transistors for brightness, op-amps, resistors, capacitors, logic circuits, microprocessors, etc. Channels may be molded, stamped, or extruded.

Wiring can be run within walls and casements in new construction or in valences or moldings when system is retrofitted. Channels with fans and control modules lend themselves to factory manufacture which can reduce costs and provide greater installation control. Power to module lines may include major current carrying wires and reference ground wire.

Multiple smaller fans can permit a reduced channel cross-section.

The system provides selective local exhaust when overheating occurs—advantage over central (or zone area) exhaust. This reduces hot spots, cold areas, draft discomfort, and retains heat in needed regions.

A 35% over-glazing and 50%/50% solar system heating is estimated above, but amount can differ resulting in different solar energy and different fuel (external) required.

Without or with minimal over glazing, the system can be useful in reducing brightness and hot and cold spots while distributing heat more efficiently.

When solar input is low, traditional thermostatic heating system automatically controls additional heat required above solar heat.

Alternatively to coated screens, solar radiant absorbing glass (or other transparent material such as plastic) can be employed to heat the plenum. An opening in the glass or transparent material or its frame near the window sill permits solar heated air to be driven out by the action of the distributing fans in the channel into the room interior at low height (similar to coated screen plenum action).

Some or all windows can employ radiant absorbing and transmitting material (may have some visibility and aesthetic advantage over coated screen). However, these absorbing and transmitting units can be mixed with screen coated energy absorbing units for facilitating outside air introduction to the interior, while blocking insects. It may be that coated screens are lower cost. Screens may also be reversed in warm weather to reflect sunlight.

Note: Glass or plastic radiant absorbing sheets may also provide additional insulation as part of the plenum when needed, for example, at night.

Figure 3:
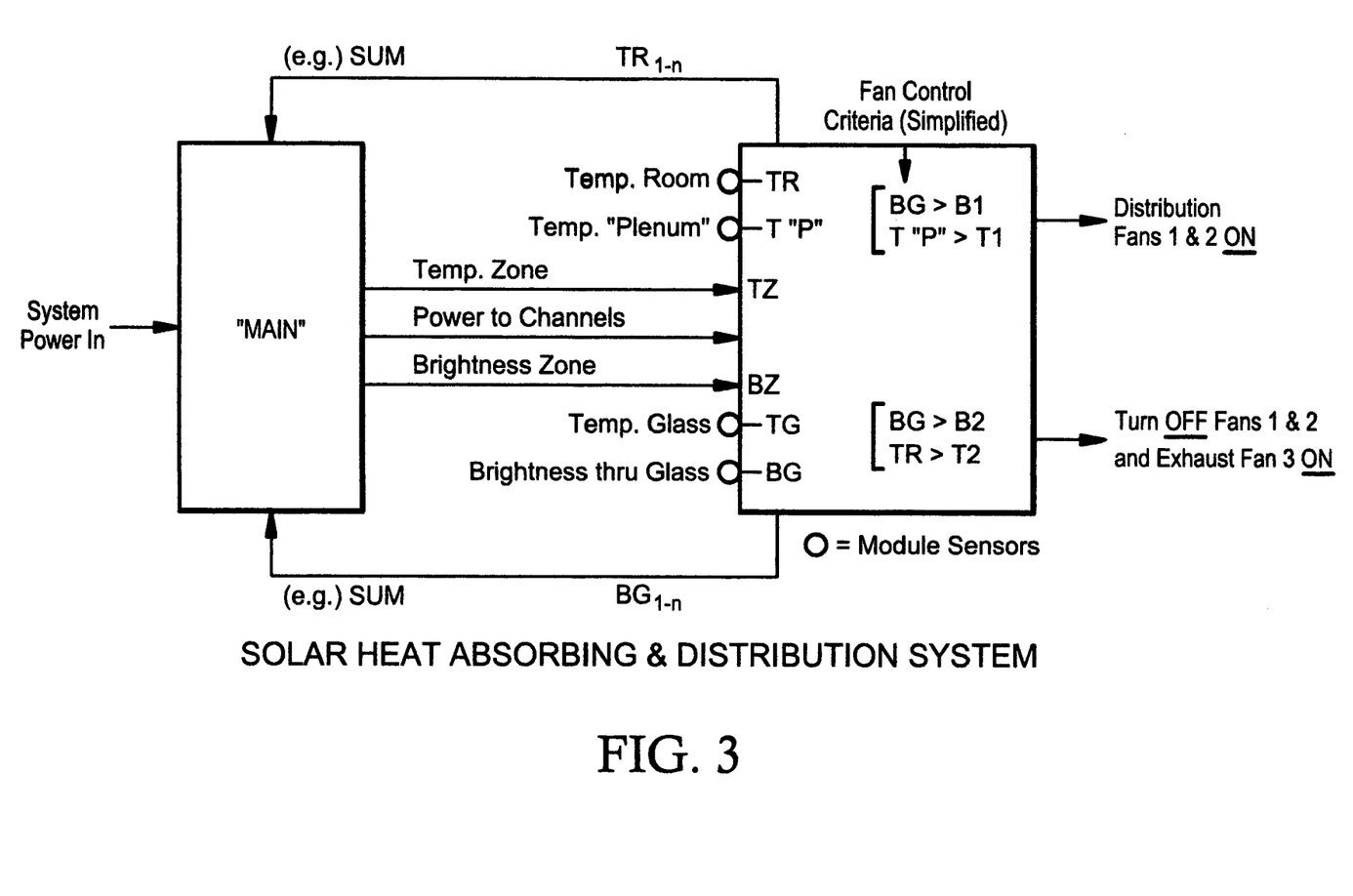
FIG. 3 is a schematic of the controls of the embodiment of FIG. 1.
Figure 5:
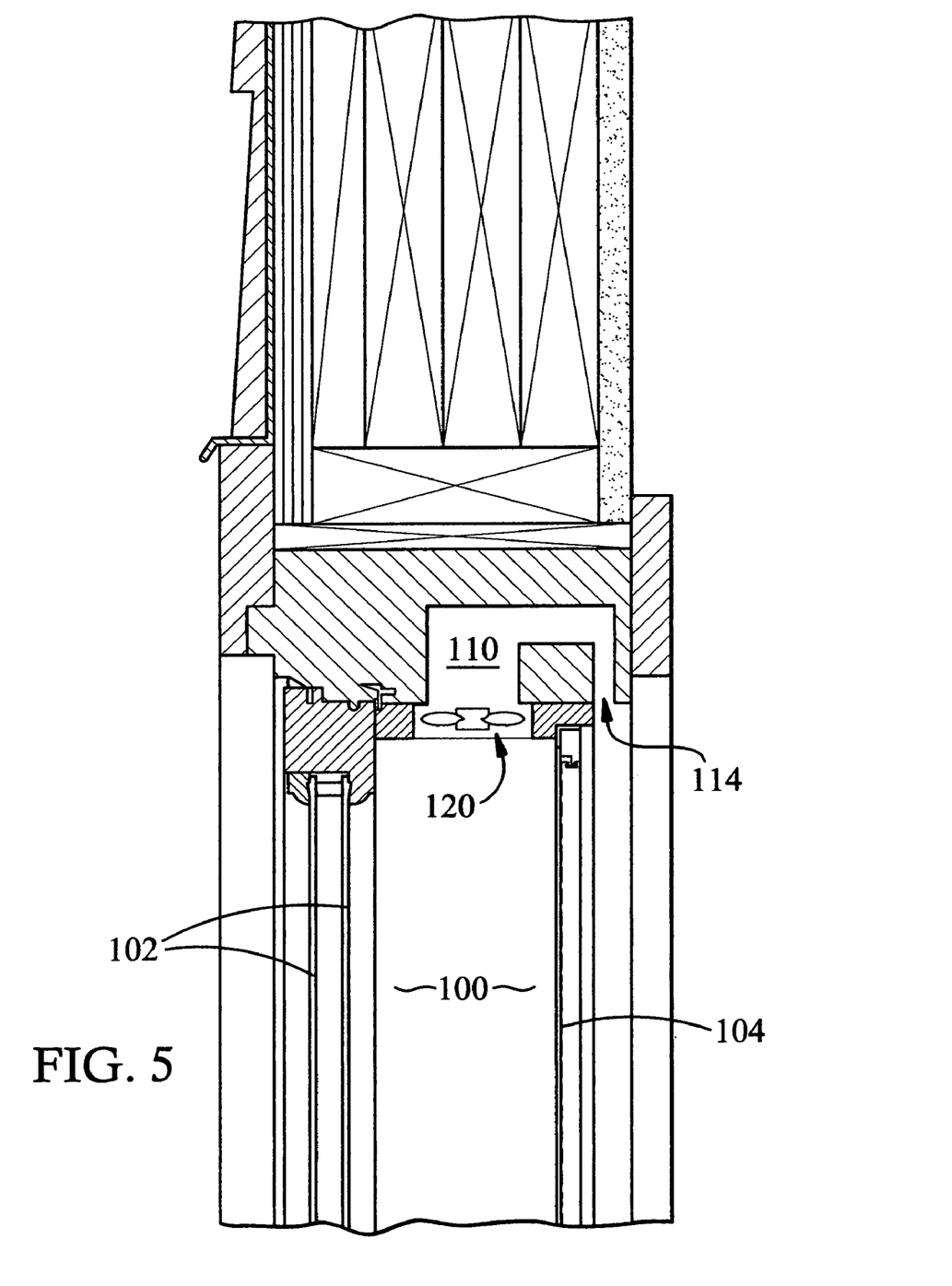
FIG. 5 is a fragmentary, side elevational view of an alternative embodiment of the present invention.
Figure 6:
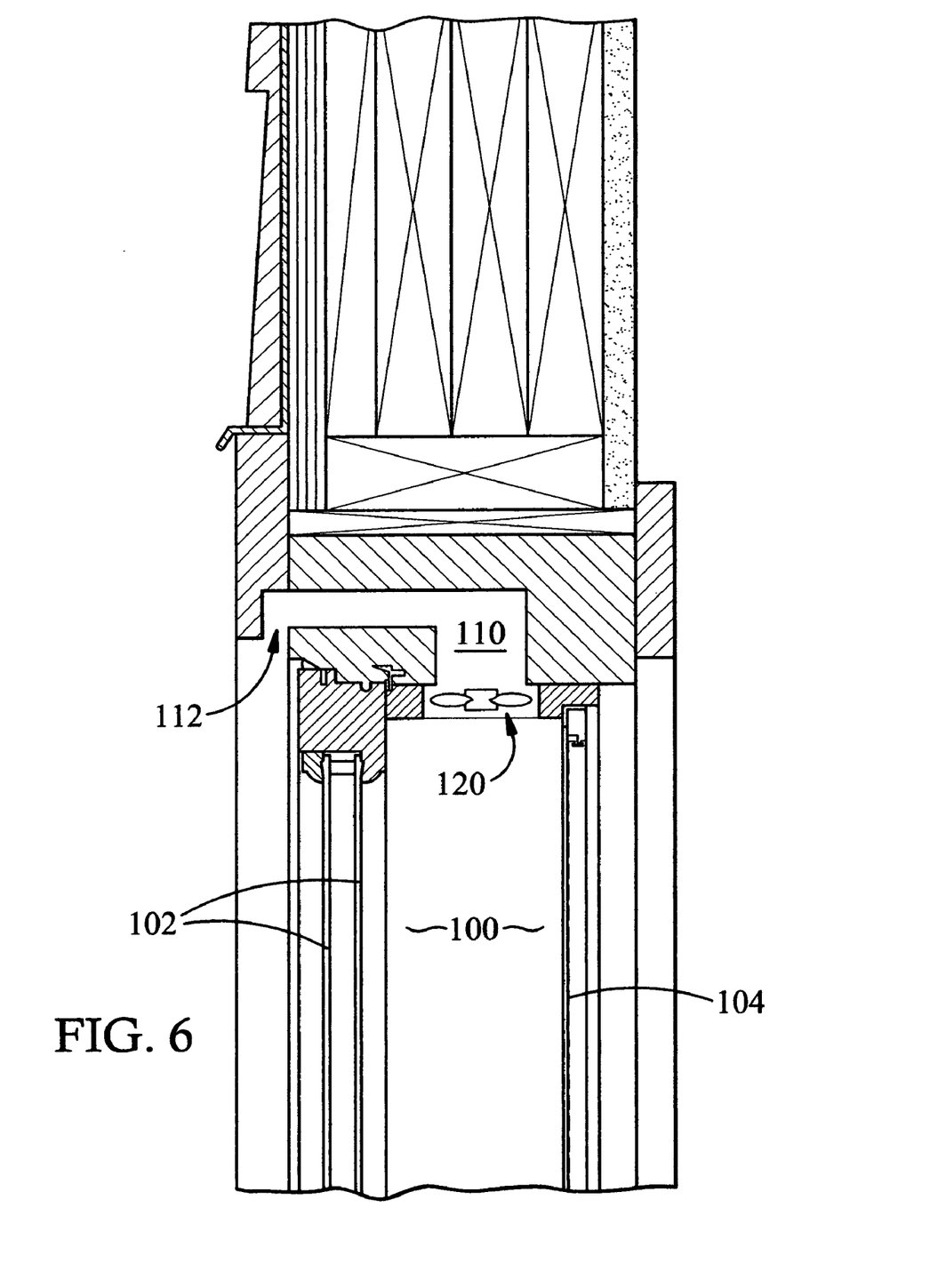
FIG. 6 is a fragmentary, side elevational view of an alternative embodiment of the present invention.

Channel/functions shown on FIGS. 1-3 may be unobtrusively incorporated in ducts in window heads during manufacture as shown on FIGS. 5 and 6 (ducts can be coated and shaped to aid flow). Channels may be used both in factory units, augmenting windows and doors, or for retrofit.

The design is applicable to factory manufacture with minor manufacturing modifications required. A manufacturing program can be initiated with single or a few window units, for example, crank controlled casement, fixed sash, or other type crank controlled windows. Systems can combine coated screens, absorbent glass (or plastic) and standard type windows.

Absorbent glass (or plastic) reduces brightness and absorbs solar energy. Some absorbent glass can be controlled electrically or as a function of solar light level.

As plenum and room temperature, TR, approaches overheating, the fans can be turned off with the chimney effect of the plenum used to heat air in the ceiling region where additional thermal mass (subject to structural limits) can be utilized. When TR is too high, exhaust fan(s) can be activated. Sophisticated controls can be employed using microprocessors or logic circuits and sensor outputs available in control modules.

Since glass (or plastic) panels aid in providing additional insulation using plenum night insulating curtains may suffice in reducing heat loss. Shutters are costly and cumbersome and take up space.

Fuel system thermostat (possibly in conjunction with system zone derived TZ) controls solar heating supplementation.

FIG. 5 illustrates an alternative embodiment (distribution mode) of the present invention. Here, a plenum 100 is formed by spaced apart window sash 102 and an interior screen or glass curtain 104. Air is drawn into plenum 100 through a chamber 110 and vent hole 114. One or more fans 120, that may be mesh protected, are provided in hollowed out portions of the window frame and provide the motive force on the air. Otherwise, the features described above with respect to FIGS. 1-4 are applicable as well.

FIG. 6 illustrates an alternative embodiment (exhaust mode) of the present invention. Here, plenum 100 is formed by spaced apart window sash 102 and interior screen or glass curtain 104. Air is exhausted from plenum 100 through chamber 110 and vent hole 112. One or more fans 120, that may be mesh protected, are provided in hollowed out portions of the window frame and provide the motive force on the air. Otherwise, the features described above with respect to FIGS. 1-4 are applicable as well.

Figure 7:
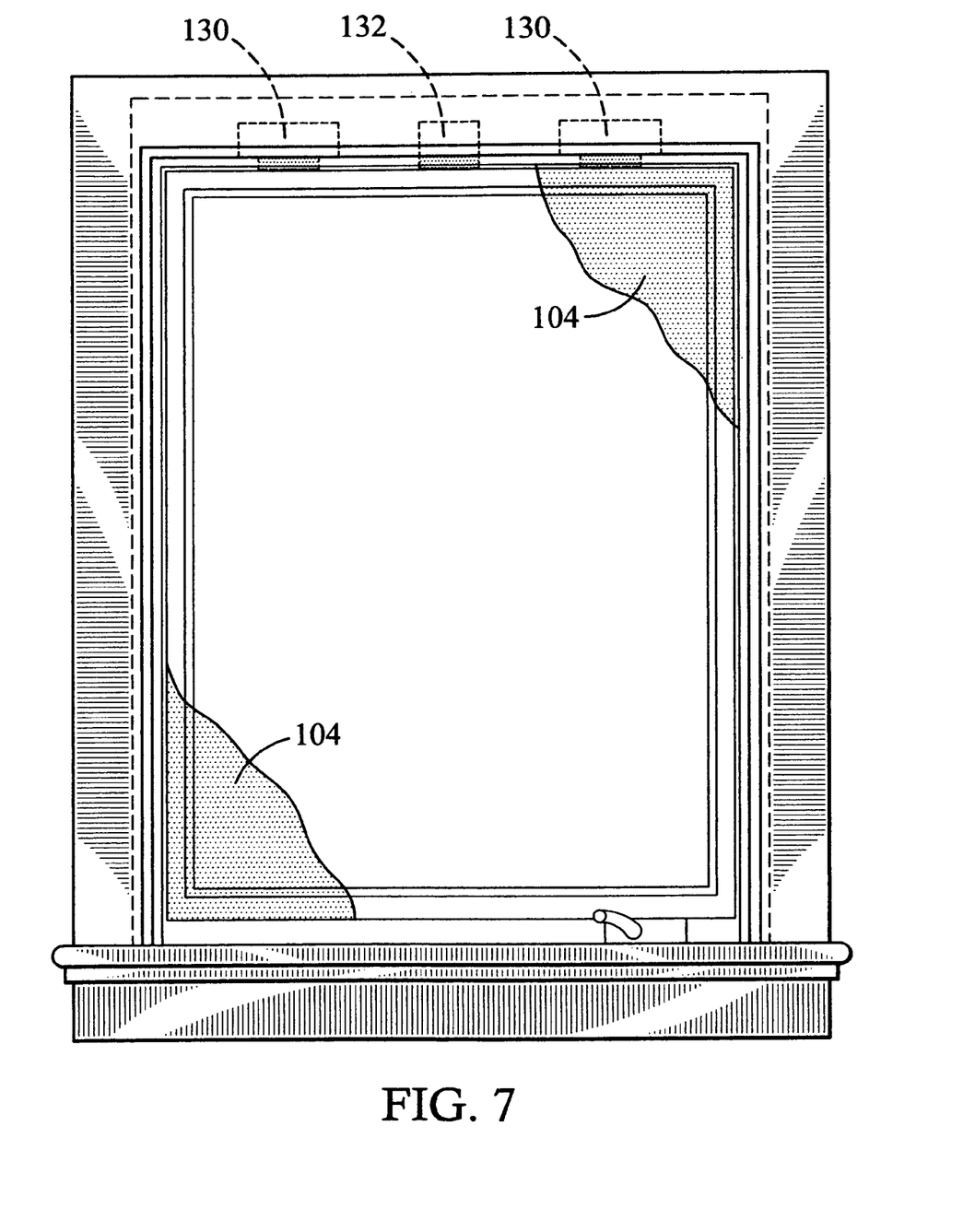
FIG. 7 is an interior end elevational view of the embodiment of FIGS. 5 and 6 as applied to a window.

FIG. 7 illustrates the embodiments of FIGS. 5 and 6 and shows two intake fans 130 and a single exhaust fan 132. Of course, different numbers of intake and exhaust fans may be employed.

On FIGS. 5, 6, and 7, fans and ducts are located in the window head. Control module may also be mounted in head. Brightness may be detected by light pipe through head and outside trim (or by a sensor mounted in the trim). Other optical means are possible, for example, using mirrors or a sensor mounted downward towards the window. Room temperature can be determined with a sensor mounted in internal trim. Plenum temperature can be measured with a sensor mounted in the jamb. Window glass temperature can be measured with a sensor contacting the glass.

Figure 8:
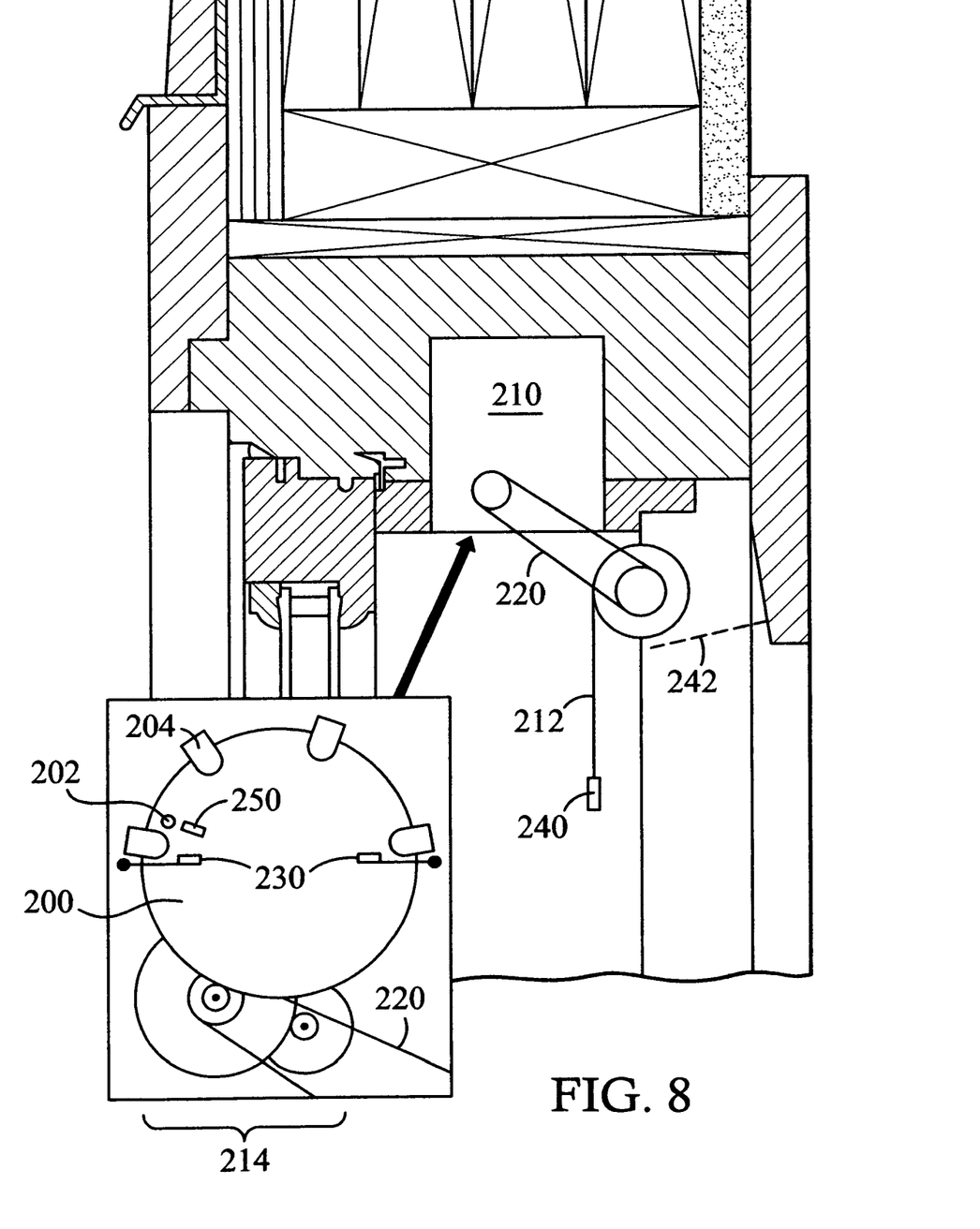
FIG. 8 is a fragmentary, side elevational view of a motorized version of the present invention.

As illustrated on FIG. 8, the system of the present invention can also be operated in either a motorized automatic solar tracking mode or in a motor assisted manual mode.

In the motorized automatic solar tracking mode, solar light absorbing and transmitting roller-shades, etc., are lowered and raised in response to east, south, west, and/or north radiation direction and intensity, employing algorithm tracking and motor drives. East to north automatic solar tracking roller shade, etc., positioning is provided through the day and evening to night, possibly employing additional information, such as, for example, time of day and year. In addition, when the sky is overcast, clear or dark, the shade position can be automatically changed. Electrical manual control intervention capability is also provided.

In the motor assisted manual mode, the control can be designed to over-ride automatic solar tracking for shade positioning using switches mounted at individual windows or doors (etc.) and/or at a main or other location. Alternatively, or in addition, for example, a device similar to a remote dimmer or TV channel selector may be used for remote shade control. Light, electro-magnetic or sonic information transmission means are feasible. As in the automatic solar tracking mode, east, west, south, and/or north manual control is feasible on individual, zone or group of windows and/or doors. Additional sensors, as later described, can be used both in automatic or manual modes to achieve a greater number of discrete shade, etc., positions. Non-electrical, manual shade, etc., control using a traditional chain and chain pulley which rotates with the roller-shade can be used with this system. Gearing, belt, and stops maintain registration.

An additional significant feature is the incorporation of interconnected solar cells (or other solar-electric converter) in a flexible roller-shade (plastic or glass interior panel, or screen). Solar arrays can charge a battery or supplement grid power. An inverter can supply critical emergency power to refrigerators, water pumps, heating units, or lights, etc. Electric power can be drawn from the roller using traditional rotating electrical contact techniques.

Plenum collection of solar energy provides electricity and heats plenum air which increases cell temperature and efficiency. The system also distributes and exhausts air as described in the parent application.

Multiple exposures (east, south, and/or west) provide comparable solar energy collection to single plane solar roof arrays, with greater weather and glass protection.

Optimum clarity is achieved using roller-shade solar tracking. With shades lowered, the additional insulation is particularly effective at night. Interior panels also provide insulation.

Solar cell interior energy conversion provides a cost effective practical alternative to roof solar arrays. Window and door units have functions in addition to energy collection and provide a low maintenance, aesthetic solar cell mounting approach.

In the automatic solar tracking mode, individual window (door, skylight, etc.) or zone oriented control using brightness in conjunction with plenum, glass, room, or zone temperatures, as described in the parent application, can be employed in sun movement algorithms to control individual shades (etc.) and to control shades in zones or solar oriented groups in a simultaneous or staggered manner. Shades (etc.) can be raised at very low solar energy absorption and low brightness periods to improve external visibility and clarity without compromising heat absorption or comfort. East-south-west-and/or north facing windows may be grouped to create combinations of solar oriented exposures for fine progressive tracking control.

In this automatic solar tracking mode, shades are controlled to stop at discrete position sensor positions. A greater or lesser number of sensors may be employed than depicted in the detail of FIG. 8. By sensing and counting gear teeth (or other openings or protrusions on the gear disc, possibly steel), using optical, magnetic, or switch sensing, shades (etc.) can be more finely positioned.

The reference gear-disc 200 on FIG. 8, has an opening 202 for optical sensing by sensors, as at 204, (LED photo-type depicted). FIG. 8 shows a head cutout in a window head 210, located towards the end of the roller shade 212, for the mounting of motor and slip clutch 214. A timing belt 220 connects the pulley on the motor slip clutch with the pulley which rotates with roller shade 212. Registration is maintained between the roller-shade and sensing positions using the above components and gear-disc stops 230 and sensors, as at 204. A shade lower opening 240 and a grill 242 are located as shown on FIG. 8. A protrusion 250 actuates a magnetic switch associated with a sensor 204.

Alternatively, most of the above components may be mounted to the rear of the roller-shade, or within the channel version of the invention described in the parent of this application, without requiring a cutout. Gearing can replace the timing belt.

These components move the shades (etc.) up and down automatically using algorithm criteria and variables such as solar brightness and plenum, and/or room, zone, and group temperatures. Greater control sophistication using averaging, in addition to utilizing instantaneous measured levels only, for positioning is possible.

Variations in plenum temperatures lag changes in brightness. The combination of brightness and temperature measurements for roller-shade (etc.) control can be used to anticipate and avoid over-rapid or slow shade and/or zone tracking movement. Plenum temperatures and brightness are responsive to changes such a those produced by shifting clouds.

Some additional features and advantages include using different meshes and absorbing/transmitting ratio material in roller-shades (etc.) to provide various radiant to absorbing ratios.

Automatic shade (etc.) positioning criteria can be altered using selection keys located at windows, the main, or by using a TV type remote selector. Selection keys can control microprocessor programs.

Guides at sides of shades (etc.) can further confine plenum air and reduce light along casements.

The wider interior head trim, grill, and cutout shown on FIG. 8 visually obscure the motor, gearing, etc. and are in addition to the ducts depicted on FIGS. 5-7.

Registration is maintained between the roller-shade (etc.) positions and the reference gear-disc sensing positions, as shown on the detail on FIG. 8 by using a timing belt, reduction gearing, and stops. The cutout is shown containing the motor and slip clutch, gearing, sensors, and stops. However, these may be mounted behind the roller or in the channel version of the invention, as shown in the parent of the present application.

Reference to windows includes doors, fixed sash, skylights, etc.

One method that can be used to raise and lower certain blinds is to roll up the cord using motor and gearing on about a one inch diameter drum in one layer to insure registration with the stops.

Although east, south, west, and north exposures are described, intermediate compass exposures can be controlled similarly.

When the roller-shade is down, the greater air region available near the roller facilitates fan distribution and exhaust of air.

Air openings (possibly flow-responsive) at the bottom of the shade (etc.), shown on FIG. 8, shade lower opening, or in sill facilitate movement of air by fans.

Various shades (etc.) can be combined in a window or door unit, e.g., a variable Venetian blind in front of a radiant absorbent screen or panel.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. An apparatus comprising:
a highly-radiant heat-absorbing material placed closely spaced from and generally parallel to an inside surface of a glass panel that is disposed in a wall or a door, so as to form therebetween a plenum, said highly-radiant heat-absorbing material being at least partially visually clear;
at least one distributing fan disposed in said plenum to direct at least some air over said highly-radiant heat-absorbing material to absorb heat therefrom;
at least one temperature sensor configured to determine a temperature in said plenum; and
at least one brightness sensor,
wherein said at least one fan is arranged to draw air from a location that is located outside the plenum,
wherein said apparatus is further configured to forecast an anticipated change in temperature at least using said at least one brightness sensor, said anticipated change in temperature being unpredictable by said at least one temperature sensor alone, and
wherein said apparatus is further configured to modify operation of said at least one fan at least in response to said temperature in said plenum and said anticipated change in temperature.

2. The apparatus of claim 1,
wherein said at least one fan is configured to be powered by at least one solar cell via at least one battery that stores energy from said at least one solar cell,
wherein said highly-radiant heat-absorbing material is substantially adjacent to at least part of said location outside the plenum, and
wherein said location is on the same side of said glass panel as said at least one fan.

3. The apparatus as defined in claim 1, further comprising: at least one exhaust fan disposed in said plenum to exhaust heated air from said plenum.

4. The apparatus as defined in claim 3, wherein said at least one exhaust fan is disposed in a top of said plenum.

5. The apparatus as defined in claim 3, wherein said at least one exhaust fan is about 2-3 inches square.

6. The apparatus as defined in claim 1, wherein said at least one distributing fan is disposed in said plenum.

7. The apparatus as defined in claim 1, wherein said highly-radiant heat-absorbing material comprises one or more selected from the group consisting of: a screen coated on at least one side by a radiant heat-absorbing paint, a radiant heat-absorbing aluminum screen, a radiant heat-absorbing grey plastic screen, a radiant heat-absorbing glass, and a radiant heat-absorbing plastic.

8. The apparatus as defined in claim 1, wherein said at least one distributing fan is about 2-3 inches square.

9. The apparatus as defined in claim 1, wherein said highly-radiant heat-absorbing material is disposed about 2-3 inches from said interior surface of said glass panel.

10. The apparatus as defined in claim 1, wherein said highly-radiant heat-absorbing material is a screen coated on one side by a radiant heat-absorbing paint and said screen is reversible to present a non-heat-absorbing side to said glass panel.

11. The apparatus, as defined in claim 1, wherein said apparatus operates in an automatic solar tracking mode.

12. The apparatus, as defined in claim 1, wherein said apparatus operates in a motor assisted manual control mode.

13. The apparatus of claim 1, further comprising at least one solar cell, wherein said at least one fan is configured to be powered by said at least one solar cell.

14. The apparatus of claim 1, wherein said at least one fan is configured to be powered by an alternating current power source.

15. The apparatus of claim 1, wherein said highly-radiant heat-absorbing material is at least partly movable or adjustable or rollable, and is automatically controllable at least in response to data from said at least one brightness sensor.

16. A system comprising:
a highly-radiant heat-absorbing material placed closely spaced from and generally parallel to an inside surface of a glass panel that is disposed in a wall or a door, so as to form therebetween a plenum, said highly-radiant heat-absorbing material being at least partially visually clear;
at least one distributing fan disposed in said plenum to direct at least some air over said highly-radiant heat-absorbing material to absorb heat therefrom;
at least one temperature sensor configured to determine a temperature in said plenum; and
at least one brightness sensor,
wherein said at least one fan is arranged to draw air from a location outside the plenum,
wherein said system is configured to forecast an anticipated change in temperature at least using said at least one brightness sensor, said anticipated change in temperature being unpredictable by said at least one temperature sensor alone, and
wherein said system is further configured to modify operation of said at least one fan at least in response to said temperature in said plenum and said anticipated change in temperature.

17. The system of claim 16,
wherein said at least one fan is configured to be powered by at least one solar cell via at least one battery that stores energy from said at least one solar cell,
wherein said material is substantially adjacent to at least part of said location, and
wherein said location is on the same side of said glass panel as said at least one fan.

18. The system of claim 16, further comprising at least one solar cell,
wherein said at least one fan is configured to be powered by said at least one solar cell.

19. The system of claim 16, wherein said at least one fan is configured to be powered by an alternating current power source.

20. The system of claim 16, wherein said highly-radiant heat-absorbing material is at least partly movable or adjustable or rollable, and is automatically controllable at least in response to data from said at least one brightness sensor.

21. An apparatus comprising:
means for absorbing radiant heat, placed closely spaced from and generally parallel to an inside surface of a glass panel that is disposed in a wall or a door, so as to form therebetween a plenum, said means for absorbing radiant heat being at least partially visually clear;
means for blowing air, disposed in said plenum to direct at least some air over means for absorbing radiant heat, in order to absorb heat therefrom;
means for sensing temperature configured to determine a temperature in said plenum; and means for sensing brightness, wherein said means for blowing air is also for drawing air from a location outside the plenum, wherein said apparatus is further configured to forecast an anticipated change in temperature at least using said at least one means for sensing brightness, said anticipated change in temperature being unpredictable by said means for sensing temperature alone, and wherein said apparatus is further configured to modify operation of said means for blowing air at least in response to said temperature in said plenum and said anticipated change in temperature.

22. The apparatus of claim 21, wherein said means for blowing air is configured to be powered by a means for generating electrical current via at least one battery that stores energy from said means for generating electrical current, said means for absorbing heat being substantially adjacent to at least part of said location, and wherein said location is on the same side of said glass panel as said means for blowing air.

23. The apparatus of claim 21, further comprising means for generating electrical current from solar radiation, wherein said means for blowing air is powered by said means for generating electrical current.

24. The apparatus of claim 21, wherein said means for blowing air is powered by an alternating current power source.

25. The apparatus of claim 21, wherein said means for absorbing radiant heat is at least partly movable or adjustable or rollable, and is automatically controllable at least in response to data from said at least one means for sensing brightness.

26. An apparatus or system comprising:

a highly-radiant heat-absorbing material placed generally parallel to an inside surface of a glass panel that is disposed in a wall or a door, so as to form therebetween a plenum, said highly-radiant heat-absorbing material being at least partially visually clear;

at least one distributing fan disposed in said plenum to direct at least some air so as to absorb heat from said highly-radiant heat-absorbing material;

at least one temperature sensor configured to determine a temperature in said plenum; and at least one brightness sensor, wherein said at least one fan is arranged to move air between the plenum and a location that is not within the plenum, wherein said apparatus or system is further configured to forecast an anticipated change in temperature at least using said at least one brightness sensor, said anticipated change in temperature being unpredictable by said at least one temperature sensor alone, wherein said apparatus or system is further configured to modify operation of said at least one fan at least in response to said temperature in said plenum and said anticipated change in temperature; and wherein said highly-radiant heat-absorbing material is at least partly movable or adjustable or rollable, and is automatically controllable at least in response to data from said brightness sensor.

27. The apparatus or system of claim 26, wherein said at least one fan is configured to be powered by at least one solar cell via at least one battery that stores energy from said at least one solar cell, wherein said highly-radiant heat-absorbing material is substantially adjacent to at least part of said location outside the plenum, and wherein said location is on the same side of said glass panel as said at least one fan.

* * * * *

UNITED STATES PATENT AND TRADEMARK OFFICE
CERTIFICATE OF CORRECTION

PATENT NO.        : 7,631,641 B1                             Page 1 of 1
APPLICATION NO.   : 11/999970
DATED             : December 15, 2009
INVENTOR(S)       : Goldman et al.

It is certified that error appears in the above-identified patent and that said Letters Patent is hereby corrected as shown below:

Column 5, line 20, please insert the phrase --control channels (for aesthetics or cost reduction).-- after the word "increase".

Column 5, line 30, please remove the phrase "control channels (for aesthetics or cost reduction)."

Signed and Sealed this

Sixteenth Day of March, 2010

David J. Kappos
*Director of the United States Patent and Trademark Office*